(12) United States Patent
Seo et al.

(10) Patent No.: US 12,459,050 B2
(45) Date of Patent: Nov. 4, 2025

(54) JOINING DEVICE AND JOINING METHOD

(71) Applicant: NIPPON LIGHT METAL COMPANY, LTD., Tokyo (JP)

(72) Inventors: Nobushiro Seo, Shizuoka (JP); Ryo Yoshida, Shizuoka (JP); Shingo Koizumi, Shizuoka (JP); Keita Oikawa, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 0 days.

(21) Appl. No.: 18/255,825

(22) PCT Filed: Nov. 1, 2021

(86) PCT No.: PCT/JP2021/040223
§ 371 (c)(1),
(2) Date: Jun. 2, 2023

(87) PCT Pub. No.: WO2022/118586
PCT Pub. Date: Jun. 9, 2022

(65) Prior Publication Data
US 2024/0009754 A1    Jan. 11, 2024

(30) Foreign Application Priority Data
Dec. 3, 2020    (JP) .................................. 2020-201216

(51) Int. Cl.
*B23K 20/12*    (2006.01)

(52) U.S. Cl.
CPC .......... *B23K 20/123* (2013.01); *B23K 20/126* (2013.01)

(58) Field of Classification Search
CPC .......................... B23K 20/123; B23K 20/126; B23K 20/1265; B23K 20/24; B23K 20/122–128
(Continued)

(56) References Cited

U.S. PATENT DOCUMENTS 6,299,050 B1 * 10/2001 Okamura ............. B23K 20/125
                                                228/2.1
6,421,578 B1 *  7/2002 Adams ................. B23K 20/123
                                                700/212
(Continued)

FOREIGN PATENT DOCUMENTS

CA       2266613 A1 *  4/1998
CN     105921876 A  *  9/2016 ......... B23K 20/1245
(Continued)

OTHER PUBLICATIONS

International Search Report and Written Opinion for PCT/JP2021/040223 (Jan. 18, 2022).
(Continued)

*Primary Examiner* — Kiley S Stoner
(74) *Attorney, Agent, or Firm* — Merchant & Gould P.C.

(57) ABSTRACT

The present invention aims to provide a joining method that can prevent poor joining. The present invention provides a joining method including: a measuring step that measures a height near a joint portion, which serves as a part for joining formed by a first metal member and a second metal member placed in a positional relationship for joining by abutting or overlapping, and obtains measured values; a setting step that sets a height position of a rotating tool based on the measured values obtained by the measuring step; and a friction stir step that relatively moves the turning rotating tool along the joint portion based on the height position set by the setting step.

17 Claims, 9 Drawing Sheets

(58) Field of Classification Search
USPC .............. 228/2.1, 112.1, 102–105, 8–12
See application file for complete search history.

(56) References Cited

U.S. PATENT DOCUMENTS

| | | | | |
|---|---|---|---|---|
| 8,052,029 | B1 * | 11/2011 | Sigler | B23K 20/123 228/103 |
| 2002/0027155 | A1 * | 3/2002 | Okamura | B23K 20/124 228/2.1 |
| 2004/0173663 | A1 * | 9/2004 | Okamoto | B23K 20/123 228/2.1 |
| 2008/0073409 | A1 * | 3/2008 | Ostersehlte | B23K 20/123 228/2.3 |
| 2013/0327813 | A1 * | 12/2013 | Castillo | B23K 20/1265 228/2.1 |
| 2014/0183246 | A1 * | 7/2014 | Saitou | B23K 20/1245 228/2.1 |
| 2015/0209893 | A1 | 7/2015 | Hori et al. | |
| 2016/0325374 | A1 | 11/2016 | Hori et al. | |
| 2018/0141152 | A1 | 5/2018 | Hori et al. | |
| 2018/0264584 | A1 | 9/2018 | Hori et al. | |
| 2020/0246908 | A1 | 8/2020 | Tomioka | |
| 2021/0316390 | A1 * | 10/2021 | Ishiguro | B23K 20/125 |
| 2022/0126394 | A1 * | 4/2022 | Ishiguro | B23K 20/1255 |

FOREIGN PATENT DOCUMENTS

| | | | | |
|---|---|---|---|---|
| CN | 108031968 | A * | 5/2018 | ........... B23K 20/122 |
| CN | 108637460 | A * | 10/2018 | ........... B23K 20/122 |
| CN | 109048038 | A * | 12/2018 | ......... B23K 20/1245 |
| CN | 109175668 | A * | 1/2019 | ........... B23K 20/123 |
| CN | 109865932 | A | 6/2019 | |
| CN | 110653483 | A * | 1/2020 | |
| CN | 111185660 | A * | 5/2020 | ........... B23K 20/122 |
| CN | 111482696 | A * | 8/2020 | ........... B23K 20/122 |
| CN | 111496370 | A | 8/2020 | |
| CN | 112139653 | A * | 12/2020 | |
| CN | 112139654 | A * | 12/2020 | |
| CN | 112548316 | A * | 3/2021 | .............. B23C 3/12 |
| CN | 112589256 | A * | 4/2021 | |
| CN | 112643190 | A * | 4/2021 | |
| DE | 102004030381 | B3 * | 1/2006 | ........... B23K 20/123 |
| DE | 202014003072 | U1 * | 6/2014 | ......... B23K 20/1245 |
| DE | 102014005315 | B3 * | 6/2015 | ........... B23K 20/121 |
| EP | 3778094 | A1 * | 2/2021 | ........... B23K 20/122 |
| JP | 2004-101275 | A | 4/2004 | |
| JP | 2006-289477 | A | 10/2006 | |
| JP | 2007-118061 | A | 5/2007 | |
| JP | 2015-104750 | A | 6/2015 | |
| JP | 2015-116593 | A | 6/2015 | |
| JP | 2015-131321 | A | 7/2015 | |
| JP | 5945348 | B1 * | 7/2016 | ........... B23K 20/123 |
| JP | 2018-065164 | A | 4/2018 | |
| JP | 6553791 | B1 * | 7/2019 | ........ B23K 20/1225 |
| JP | 2020-124745 | A | 8/2020 | |
| KR | 102091669 | B1 * | 5/2020 | |
| KR | 102182975 | B1 * | 11/2020 | |
| TW | 201527020 | A | 7/2015 | |
| WO | WO-2014077812 | A1 * | 5/2014 | ........... B23K 20/123 |
| WO | WO-2015060007 | A1 * | 4/2015 | ........... B23K 20/002 |
| WO | WO-2020059686 | A1 * | 3/2020 | ........ B23K 20/1225 |
| WO | WO-2022200585 | A1 * | 9/2022 | ........ B23K 20/1255 |

OTHER PUBLICATIONS

First Office Action for Taiwanese Patent Application No. 110142374 (Jul. 6, 2022).
Second Office Action for Taiwanese Patent Application No. 110142374 (Dec. 8, 2022).
Office Action for Japanese Patent Application No. 2020-201216 (Jul. 9, 2024).
Extended European Search Report issued for EP Application No. 21900341.5 (Nov. 11, 2024).

* cited by examiner

|    | MEASURED VALUE (mm) | HEIGHT POSITION (mm) |
|----|---------------------|----------------------|
| P1 | 4.8                 | 4.8                  |
| P2 | 5.0                 | 5.0                  |
| P3 | 5.4                 | 5.4                  |
| P4 | 5.7                 | 5.7                  |
| P5 | 5.5                 | 5.5                  |
| P6 | 5.4                 | 5.4                  |
| P7 | 5.3                 | 5.3                  |
| P8 | 5.1                 | 5.1                  |

JOINING DEVICE AND JOINING METHOD

This application is a National Stage Application of PCT/JP2021/040223, filed Nov. 1, 2021, which claims benefit of priority to Japanese Application No. 2020-201216, filed Dec. 3, 2020, and which applications are incorporated herein by reference. To the extent appropriate, a claim of priority is made to each of the above disclosed applications.

TECHNICAL FIELD

The present invention relates to a joining device and a joining method.

BACKGROUND ART

For example, Patent Literature 1 discloses a technique in which a first metal member and a second metal member are abutted against each other to form an abutting portion, and a rotating tool is moved along the abutting portion to perform friction stir joining.

CITATION LIST

Patent Literature

Patent Literature 1: JP2018-65164A

SUMMARY OF INVENTION

Technical Problem

The height positions of the first metal member and the second metal member vary due to factors such as warping, twisting, and other deformations, as well as dimensional tolerances of each metal member. Furthermore, there is a possibility that foreign objects might become lodged between the jig of the mounting platform and the first metal member and second metal member, or that insufficient clamping or defective clamping of the jig may occur. If the height positions of the first metal member and the second metal member exceed the allowable range, the likelihood of poor joining increases, regardless of how the rotating tool is controlled.

From this perspective, the present invention aims to provide a joining method that can prevent poor joining.

Solution to Problem

The present invention for achieving the above aim provides a joining device including: a measuring part that measures a height near a joint portion, which serves as a part for joining formed by a first metal member and a second metal member placed in a positional relationship for joining by abutting or overlapping, and obtains measured value or values; a setting part that sets a height position of a rotating tool based on the measured value or values obtained by the measuring part; and a friction stir body that relatively moves the turning rotating tool along the joint portion based on the height position.

The present invention provides a joining method including: a measuring step that measures a height near a joint portion, which serves as a part for joining formed by a first metal member and a second metal member placed in a positional relationship for joining by abutting or overlapping, and obtains measured value or values; a setting step that sets a height position of a rotating tool based on the measured value or values obtained by the measuring step; and a friction stir step that relatively moves the turning rotating tool along the joint portion based on the height position set by the setting step.

Preferably, the joining device further includes a fixing part that fixes the first metal member to a mounting platform, in which the measuring part measures the first metal member fixed to the mounting platform to obtain the measured values.

Preferably, the joining method further includes a fixing step that fixes the first metal member to a mounting platform, in which the measuring step measures the first metal member fixed to the mounting platform in the fixing step to obtain the measured values.

Preferably, the joining device further includes a fixing part that fixes the first metal member and the second metal member to a mounting platform, in which the fixing part fixes the first metal member and the second metal member to the mounting platform, with the first metal member and the second metal member being placed in a positional relationship for joining by abutting or overlapping, thereby forming the joint portion, and the measuring part measures at least one of the first metal member and the second metal member fixed to the mounting platform to obtain the measured values.

Preferably, the joining method further includes a fixing step that fixes the first metal member and the second metal member to a mounting platform, in which the fixing step fixes the first metal member and the second metal member to the mounting platform, with the first metal member and the second metal member being placed in a positional relationship for joining by abutting or overlapping, thereby forming the joint portion, and the measuring step measures at least one of the first metal member and the second metal member fixed to the mounting platform in the fixing step to obtain the measured values.

Preferably, the measuring part is provided near a part where the rotating tool is held.

Preferably, the setting part sets the measured values as the height position.

Preferably, the rotating tool includes a connecting part that is connected to a rotating shaft of the friction stir body, and a stirring pin that hangs down from the connecting part, and the friction stir body relatively moves the rotating tool while keeping the connecting part away from the joint portion.

Preferably, the setting part sets a lowest value among the measured values to the height position.

Preferably, the rotating tool includes a shoulder part that is connected to a rotating shaft of the friction stir body, and a stirring pin that hangs down from the shoulder part, and the friction stir body relatively moves the rotating tool while keeping the shoulder part and the stirring pin in contact with the joint portion.

Preferably, the setting part sets an average value of the measured values to the height position.

Preferably, the rotating tool includes a connecting part that is connected to a rotating shaft of the friction stir body, and a stirring pin that hangs down from the connecting part, and the friction stir body relatively moves the rotating tool while keeping the connecting part away from the joint portion.

Preferably, if the measured values are not within a preset allowable range, the first metal member and the second metal member are reset.

Preferably, if the measured values are not within a preset allowable range, the first metal member and the second metal member are identified as a product out of the allowable range.

Advantageous Effects of Invention

According to the joining device and joining method according to the present invention, it is easier to prevent poor joining.

DESCRIPTION OF EMBODIMENTS

Embodiments of the present invention will be described with reference to the drawings as appropriate. The present invention is not limited only to the following embodiments. Also, some or all the constituent elements in the embodiments and modified examples can be appropriately combined.

1. Embodiment 1-1. Joining Device

Figure 1:
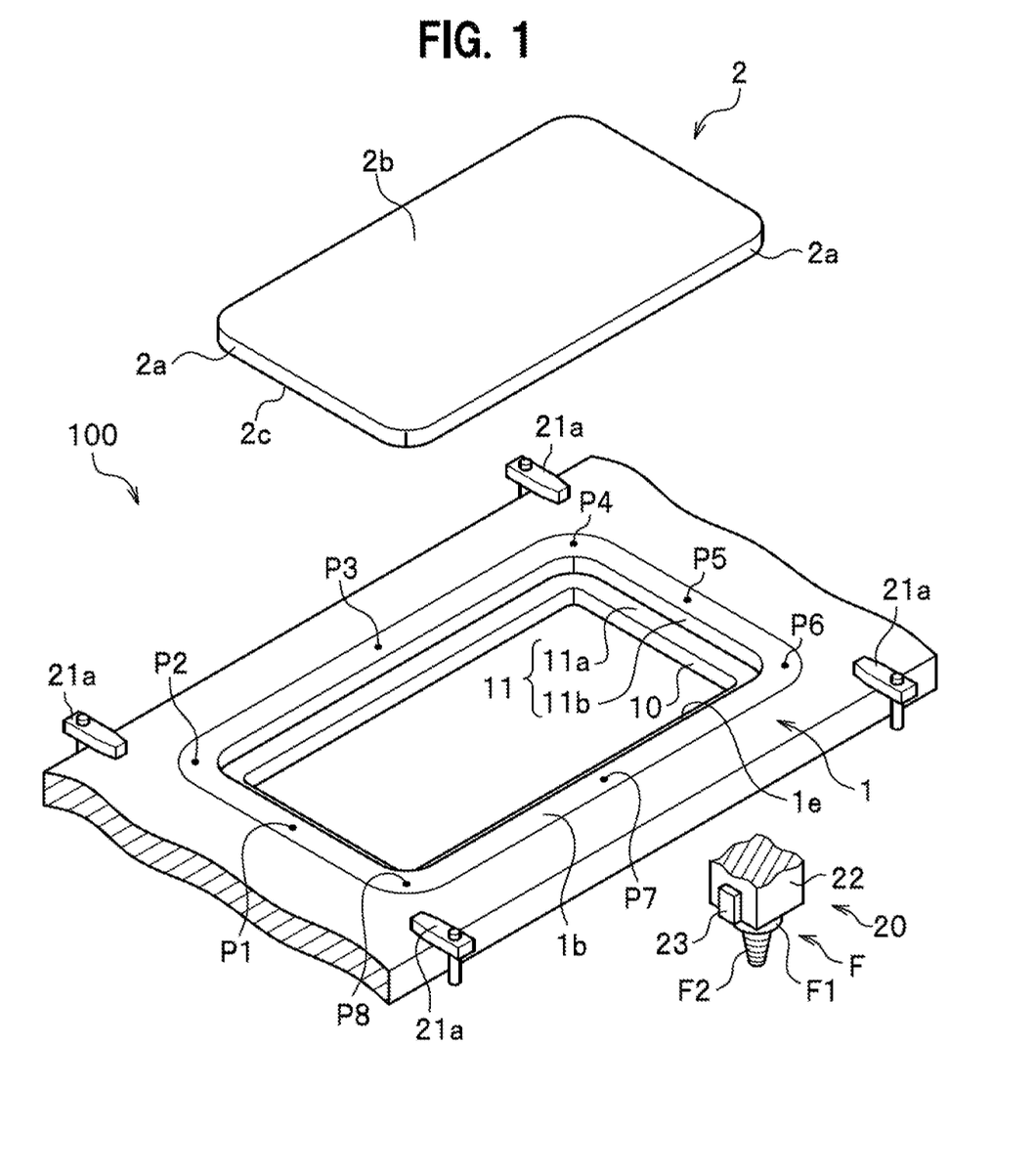
FIG. 1 is a perspective view showing a first metal member, a second metal member, and a friction stir body according to an embodiment of the present invention.

As shown in FIG. 1, a joining device 100 according to the embodiment of the present invention is a device for friction stir joining of a first metal member 1 and a second metal member 2 using a rotating tool F.

The first metal member 1 includes an opening 10 formed in the center, and a stepped portion 11 formed along the periphery of the opening 10. The stepped portion 11 includes a stepped bottom surface 11*a* and a stepped side surface 11*b* rising from the stepped bottom surface 11*a*. The opening 10 has a substantially rectangular shape in a plan view. The four corners of the opening 10 are subjected to fillet processing. The first metal member 1 is formed of a metal capable of friction stir joining, such as aluminum, aluminum alloy, magnesium, magnesium alloy, titanium, or titanium alloy. In the present embodiment, the first metal member 1 is formed of an aluminum alloy casting material formed by die casting.

The second metal member 2 has a substantially rectangular plate shape in a plan view. The second metal member 2 is shaped to be placed substantially without gaps in the stepped portion 11. The plate thickness of the second metal member 2 is either the same as the height dimension of the stepped side surface 11*b* or greater. By setting the plate thickness dimension of the second metal member 2 greater than the stepped side surface 11*b*, it is possible to prevent metal deficiency in the joint portion J1 (see FIG. 5). The second metal member 2 may be formed of a metal capable of friction stir joining; in the present embodiment, it is formed of an aluminum alloy extruded material.

Figure 2:
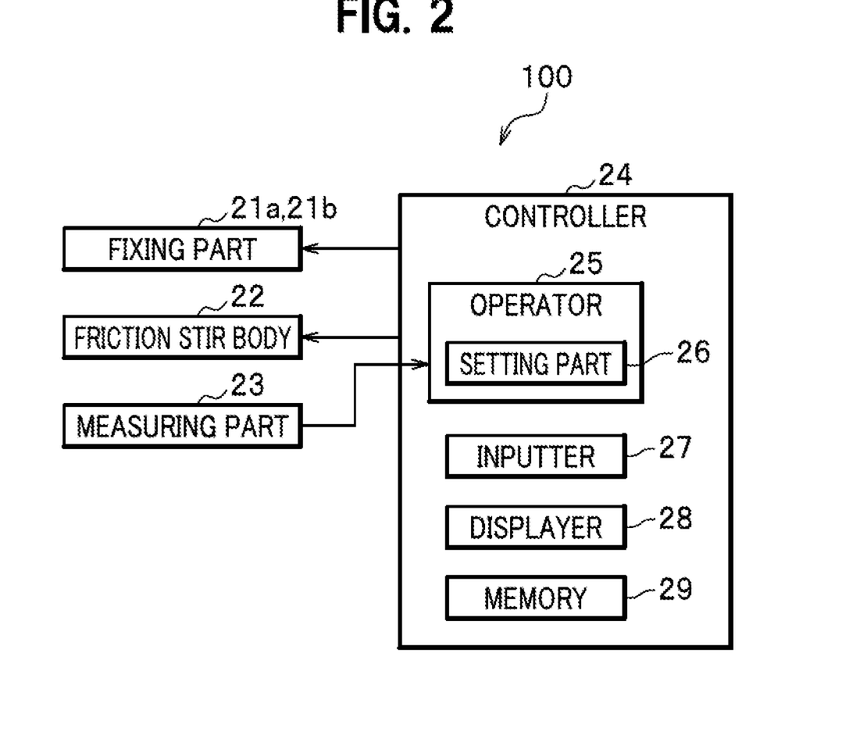
FIG. 2 is a block diagram showing a joining device of the present embodiment.

The joining device 100, as shown in FIGS. 1 and 2, is a machining center in the present embodiment and includes a fixing part 21*a* or 21*b*, a friction stir body 22, a measuring part 23, and a controller 24 (see FIG. 2). The fixing part 21*a* is a member (jig) for fixing the first metal member 1 to the mounting platform K. The fixing part 21*a* is installed at multiple locations on the mounting platform K so that it can restrain the periphery of the first metal member 1 at multiple sites. The fixing part 21*b* (see FIGS. 2 and 6) is a member (jig) for fixing the second metal member 2 to the mounting platform K. The fixing part 21*b* is installed at multiple locations on the mounting platform K so that it can restrain the periphery of the second metal member 2 at multiple sites. The fixing parts 21*a* and 21*b* are electrically connected to the controller 24 and fix or release each metal member based on control signals from the controller 24. Note that in the following description, when not particularly distinguishing between the fixing part 21*a* and fixing part 21*b*, they will be collectively referred to as the fixing part 21.

The friction stir body 22 is a part where a rotating shaft with the rotating tool F attached is housed. The friction stir body 22 is configured to be relatively movable with respect to the mounting platform K. The friction stir body 22 moves the rotating tool F relatively based on the X position (horizontal position), Y position (vertical position), and Z position (height position) of the rotating tool F, which are set by the setting part described later.

The measuring part 23 is provided on the friction stir body 22. In other words, the measuring part 23 is provided near the part where the rotating tool F is held. The measuring part 23 can use, for example, a height measuring instrument such as a laser displacement meter.

The controller 24 includes an operator 25 (CPU (Central Processing Unit)), an inputter 27 such as a keyboard or touch panel, a displayer 28 such as a monitor or display, and a memory 29 such as a RAM (Random Access Memory) or ROM (Read Only Memory).

The operator 25 has a setting part 26 as a functional element. The setting part 26 is a part for setting an instruction position (teaching position) for moving the rotating tool F. The instruction position designates the trajectory that the rotating tool F passes by using the coordinate position. That is, the instruction position can set the X position (horizontal position), Y position (vertical position), and Z position (height position) of the rotating tool F using the X, Y, and Z coordinate axes.

Figure 3:
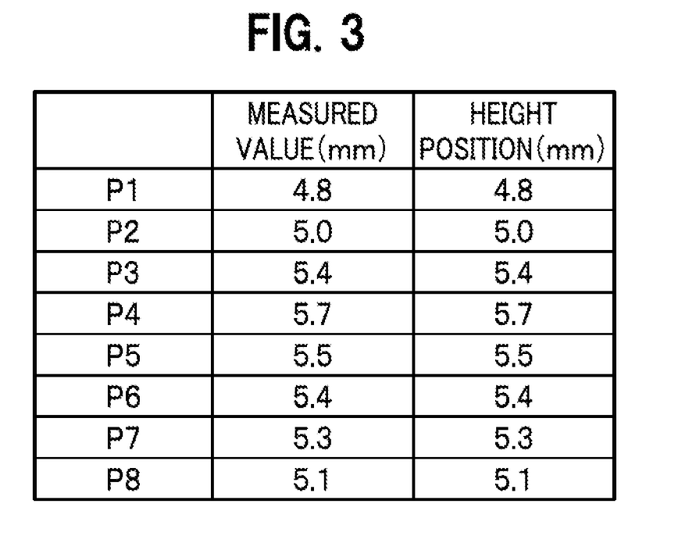
FIG. 3 is a table showing an example of measured values and height positions according to the present embodiment.

In the present embodiment, the setting part 26 is configured such that the X position and Y position of the instruction position are preset, and the Z position (height position) is set based on the measured values obtained by the measuring part 23 and the setting program. In the setting program of the present embodiment, as shown in FIG. 3, the measured value obtained by the measuring part 23 is set as the Z position (height position) of the rotating tool F. Note that setting the measured value as the height position of the rotating tool F means establishing a one-to-one correspondence between the measured value and the height position. For example, as in the present embodiment, the measured value at a certain position may be set directly as the height position of that position without any alteration added. Alternatively, for example, a predetermined numerical shift calculation may be applied to the measured value at a certain position, and that value may be set as the height position of that position. More specifically, for example, addition or subtraction with a desired numerical width may be applied to the measured value at a certain position according to the relationship between the obtained measured values and the height position of the rotating tool F, and that value may be set as the height position of that position.

For example, the operator 25 can function as the setting part 26 by reading the setting program from the ROM, expanding it in the RAM, and executing it. Furthermore, the setting program can be recorded and distributed on storage media such as optical discs like CD-ROM (Compact Disc Read only memory) and DVD-ROM (Digital Versatile Disc Read only memory); and USB (Universal Serial Bus) memory, SD memory, and other flash memory. It can also be distributed through communication networks such as the Internet and intranets. The controller 24 can obtain and execute the setting program by reading the setting program from the storage media or receiving the setting program through the communication network.

In addition, in the present embodiment, although the machining center is shown as the joining device 100, it is not limited to this. For example, the friction stir body 22 may be attached to the tip of the robot arm.

1-2. Joining Method

In the joining method according to the present embodiment, a joining device 100 is used to perform a first placement step, a first fixing step, a measuring step, a second placement step, a second fixing step, a setting step, and a friction stir step.

The first placement step is a step of placing the first metal member 1 on the mounting platform K.

Figure 4:
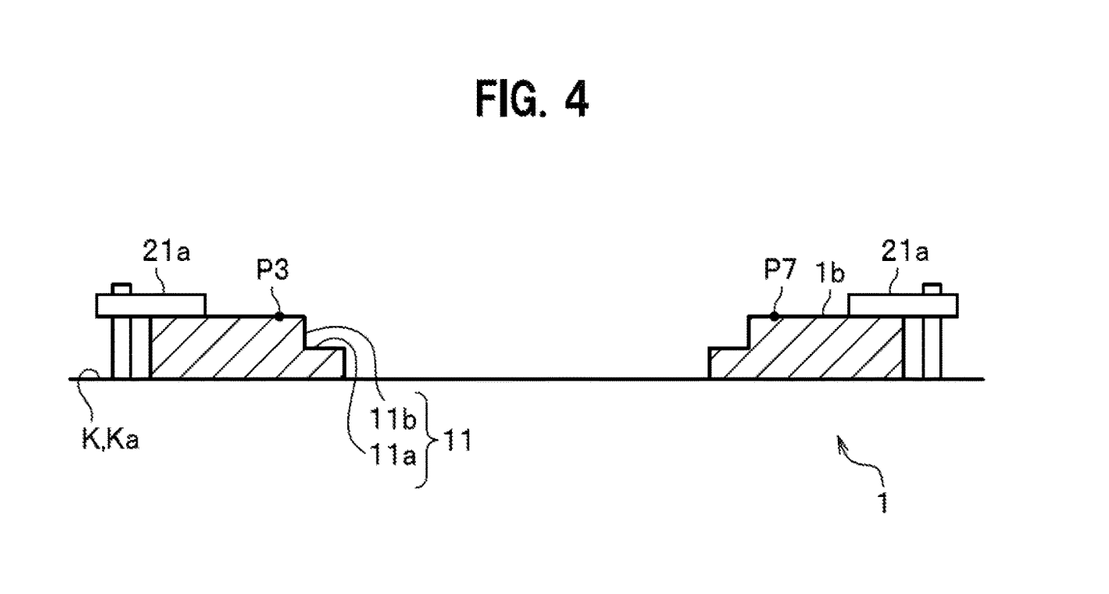
FIG. 4 is a cross-sectional view showing a first placement step of the present embodiment.

The first fixing step is a step of clamping the first metal member 1 to the surface Ka of the mounting platform K, as shown in FIG. 4. For example, a plurality of fixing parts 21a provided on the mounting platform K restrain the first metal member 1 so that it cannot move with respect to the mounting platform K.

The measuring step is a step of measuring the height of the surface 1b of the first metal member 1 using the measuring part 23, as shown in FIG. 1. In the measuring step, the height from a reference point (for example, the surface Ka of the mounting platform K) to the measurement point is measured. In the measuring step, the height near the joint portion J1 (see FIG. 5) formed by the first metal member 1 and the second metal member 2 and serving as a joint part is measured. Specifically, as shown in FIG. 1, on the surface 1b of the first metal member 1, the heights of measurement points P1 to P8 set at predetermined intervals around the outside of the opening edge 1e are measured. In the present embodiment, the measurement points are set at eight sites, but the number is not limited, and may be set at one or more sites.

In the measuring step, while keeping the rotating tool F and the joint portion J1 apart, the friction stir body 22 (measuring part 23) is made to go around along the opening edge 1e, continuously measuring the height of the measurement points P1 to P8. The measured values measured are stored in the memory 29 of the controller 24, in relation to each measurement point.

Figure 5:
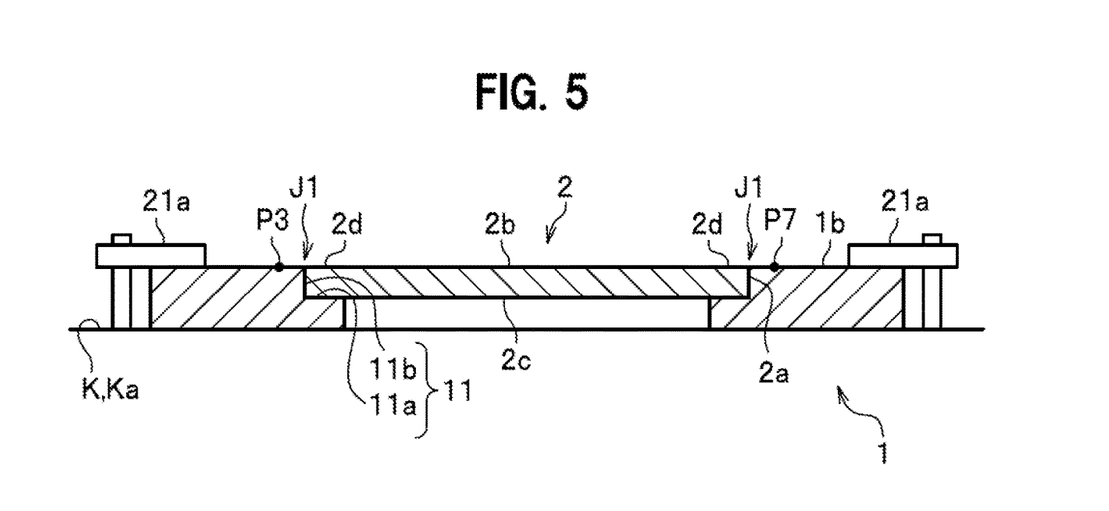
FIG. 5 is a cross-sectional view showing a second placement step of the present embodiment.

The second placement step, as shown in FIG. 5, is a step of placing the first metal member 1 and the second metal member 2 in a positional relationship for joining. The first metal member 1 and the second metal member 2 may be placed in a positional relationship for joining by abutting against each other, in a positional relationship for overlapping for joining, or in a positional relationship for joining by both abutting and overlapping. In the present embodiment, the stepped side surface 11b of the first metal member 1 and the side surface 2a of the second metal member 2 are abutted, while the stepped bottom surface 11a and the back surface 2c of the second metal member 2 are overlapped, forming the joint portion J1. That is, in the second placement step, the second metal member 2 is placed on the stepped portion 11 of the first metal member 1, forming an abutting joint portion (abutting portion) J1 between the first metal member 1 and the second metal member 2. The joint portion J1 is a part for friction stir joining by the rotating tool F in the subsequent friction stir step.

Figure 6:
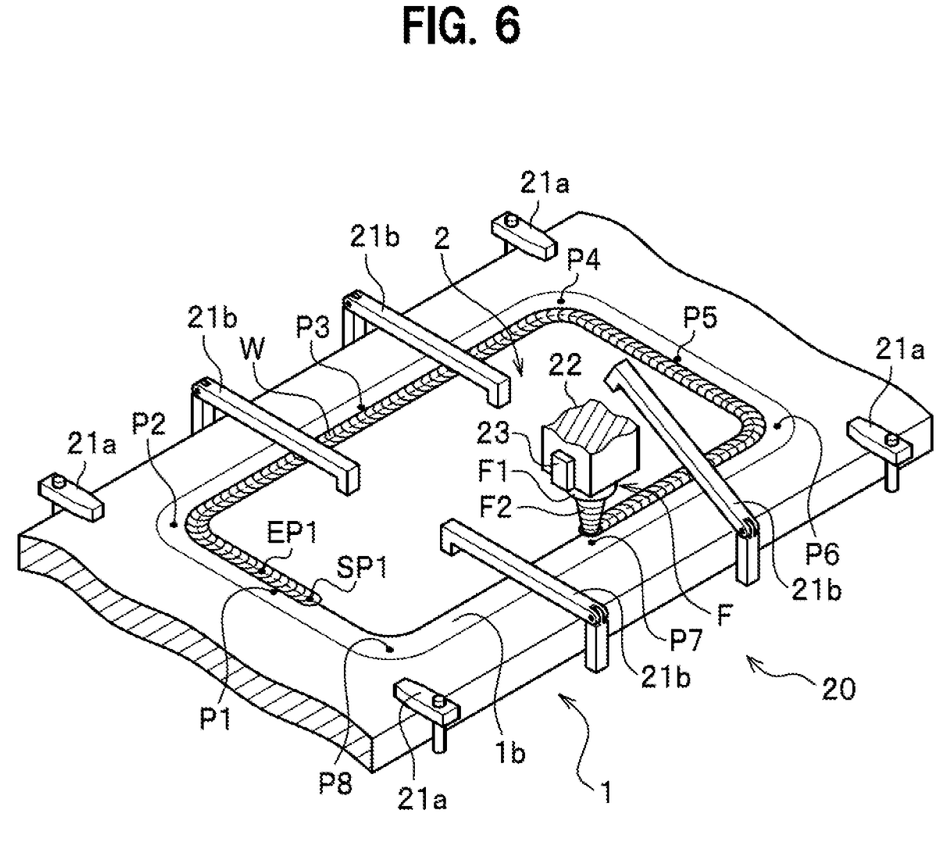
FIG. 6 is a perspective view showing a friction stir step of the present embodiment.

The second fixing step is a step of clamping the second metal member 2 to the surface Ka of the mounting platform K, as shown in FIG. 6. For example, a plurality of fixing parts 21b provided on the mounting platform K restrain the second metal member 2 so that it cannot move with respect to the mounting platform K.

The setting step is, as shown in FIG. 3, a step of setting the height position of the rotating tool F based on the measured values obtained in the measuring step and the setting program. In the present embodiment, the X position and Y position of the rotating tool F are preset as described above. As for the Z position (height position), as shown in FIG. 3, the obtained measured value is set directly as the height position.

Figure 7:
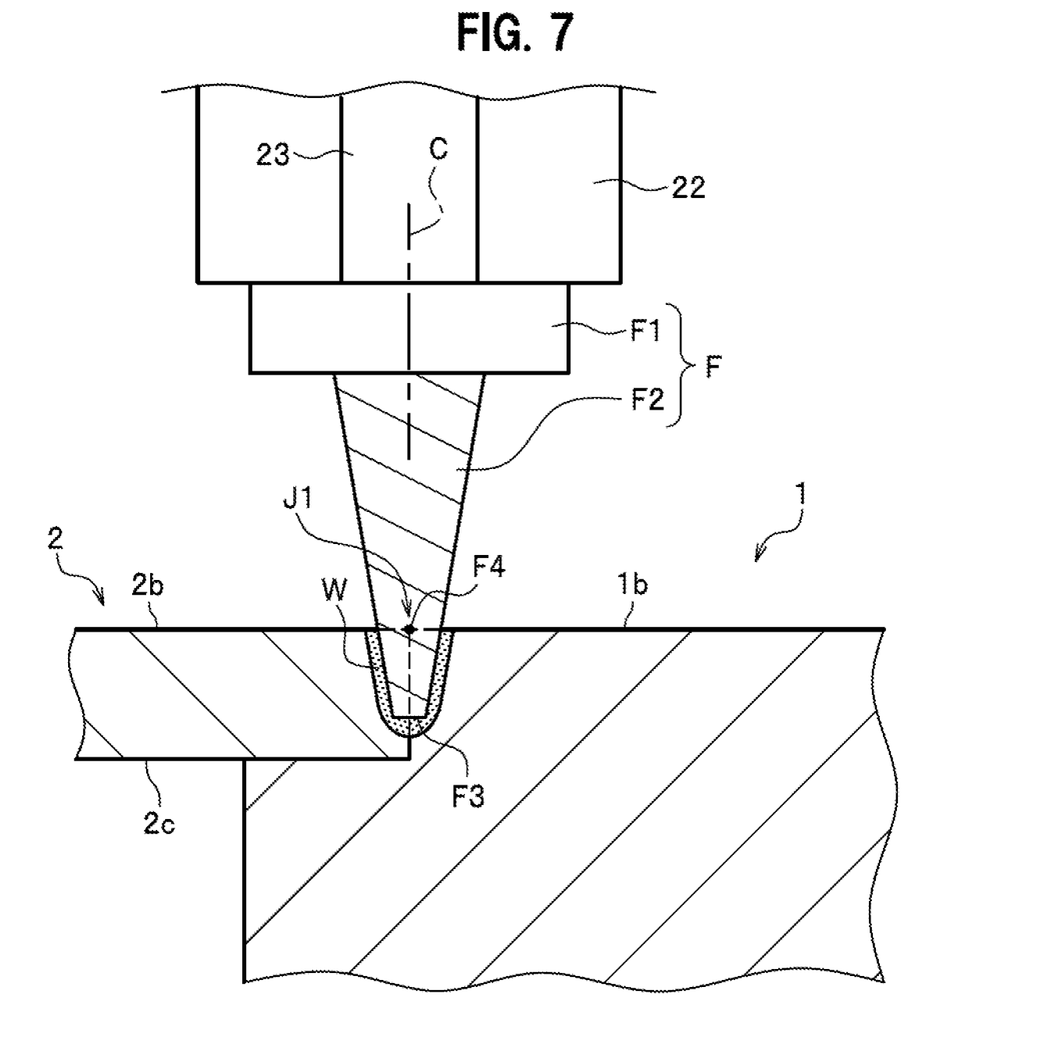
FIG. 7 is a cross-sectional view showing a friction stir step of to the present embodiment.

The friction stir step, as shown in FIGS. 6 and 7, is a step in which the rotating tool F is moved relatively along the joint portion J1 according to the set values established in the setting step to perform friction stir joining. The rotating tool F includes a connecting part F1 and a stirring pin F2. The connecting part F1 is a cylindrical-shaped part that is attached to the rotating shaft housed in the friction stir body 22. The stirring pin F2 protrudes (hangs down) from the distal end surface (lower end surface) of the connecting part F1 and tapers toward the tip side. At the tip of the stirring pin F2, a flat surface F3, perpendicular to the rotational central axis C, is formed. Note that the connecting part F1 is not limited to a cylindrical shape and may also be a frustoconical shape that narrows in diameter as it extends toward the tip side. In this case, the diameter of the distal end portion of the connecting part F1 and the diameter of the proximal end portion of the stirring pin F2 are the same. In the friction stir step, the friction stir body 22 inserts only the rotating stirring pin F2 into the joint portion while keeping the connecting part F1 away from the joint portion J1, thereby relatively moving the rotating tool F.

As shown in FIG. 7, a stirring pin reference point F4 is set at a predetermined height from the flat surface F3 on the rotational central axis C of the stirring pin F2, which serves as the center of rotation. In the present embodiment, for example, since the insertion depth is set to 2.5 mm, the predetermined height is set to 2.5 mm. The insertion depth refers to the distance from the surface 1b of the first metal member 1 to the flat surface F3 of the stirring pin F2. Note that the distance from the flat surface F3 to the stirring pin reference point F4 can be appropriately set based on the insertion depth and the measured values obtained during the measuring step, among other factors.

Spiral grooves are engraved on the outer peripheral surface of the stirring pin F2. The spiral grooves are formed in a counterclockwise direction from the base end side to the tip side when the rotating tool F is rotated to the right, and in a counterclockwise direction from the base end side to the tip side when rotated to the right. By doing so, the plastic flow material is guided to the tip side of the stirring pin F2, which can suppress the occurrence of burrs.

In the friction stir step, as shown in FIG. 6, the stirring pin F2 is inserted into the starting position SP1 set on the joint portion J1, and the rotating tool F is rotated along the joint portion J1 and moved clockwise relative to the second metal member 2. The fixing part 21b is configured to stand up just before the rotating tool F passes through based on the control signal from the controller 24 and to fix the second metal member 2 again after the tool has passed. This prevents interference between the fixing part 21b and the rotating tool F. A plasticized region W is formed along the moving trajectory of the rotating tool F. At this time, the position of the rotating tool F is controlled so that the height position of the stirring pin reference point F4 of the rotating tool F matches the set value (X position, Y position, Z position) set in the setting step. Particularly in the present embodiment, the position of the rotating tool F is moved up and down so that the Z direction becomes the height position shown in FIG. 3. In other words, at the position corresponding to the measurement point P1 in the joint portion J1, control is made such that the stirring pin reference point F4 is positioned at a position in a height direction of 4.8 mm from the surface Ka of the mounting platform K.

Moreover, at the position corresponding to the measurement point P2 in the joint portion J1, the stirring pin reference point F4 is controlled to be positioned at a position in a height direction of 5.0 mm from the surface Ka of the mounting platform K. At this time, from the measurement point P1 to the measurement point P2, the height position of the rotating tool F is controlled so that the height position of the stirring pin reference point F4 gradually increases by 0.2 mm.

Moreover, at the position corresponding to the measurement point P3 in the joint portion J1, the stirring pin reference point F4 is controlled to be positioned at a position in a height direction of 5.4 mm from the surface Ka of the mounting platform K. At this time, from the measurement point P2 to the measurement point P3, the height position of the rotating tool F is controlled so that the height position of the stirring pin reference point F4 gradually increases by 0.4 mm.

Moreover, at the position corresponding to the measurement point P4 in the joint portion J1, the stirring pin reference point F4 is controlled to be positioned at a position in a height direction of 5.7 mm from the surface Ka of the mounting platform K. At this time, from the measurement point P3 to the measurement point P4, the height position of the rotating tool F is controlled so that the height position of the stirring pin reference point F5 gradually increases by 0.3 mm.

Moreover, at the position corresponding to the measurement point P5 in the joint portion J1, the stirring pin reference point F4 is controlled to be positioned at a position in a height direction of 5.5 mm from the surface Ka of the mounting platform K. At this time, from the measurement point P4 to the measurement point P5, the height position of the rotating tool F is controlled so that the height position of the stirring pin reference point F4 gradually decreases by 0.2 mm.

In a similar procedure, while raising and lowering the height position of the rotating tool F, when the rotating tool F reaches the end position EP1 set at the joint portion J1, the rotating tool F is disengaged from the joint portion J1. In the friction stir step, it is preferable to overlap the beginning and end of the plasticized region W in this manner. This enhances the water tightness and air tightness. Through these steps, it is possible to friction stir join the first metal member 1 and the second metal member 2.

1-3. Operations and Effects

In the joining method and joining device described above, the height near the joint portion J1 before joining in the set state is measured, and the height position (insertion depth) of the rotating tool F is controlled based on the measurement results. As a result, it is possible to change the height position of the rotating tool F according to the height of the joint portion J1 in the set state, and perform pseudo load control. Therefore, even if the height of the joint portion J1 changes, the insertion depth of the rotating tool F can be maintained constant, making it easier to prevent poor joining.

Particularly in the present embodiment, the measured value is set directly as the height position of the rotating tool F, and the height position of the rotating tool F is raised or lowered based on the set value. This allows for a constant depth of the plasticized region W (insertion depth of the stirring pin F2) even if the heights of the measurement points P1 to P8 are not the same. By maintaining a constant depth of the plasticized region W, the joint strength of the joint portion J1 can be kept approximately constant in the circumferential direction. Moreover, since the measured value can be directly set as the height position, the setting of the height position (set value) can be easily performed.

In addition, the type (shape) of the rotating tool F can be any suitable one, but in the present joining method, the friction stir joining is performed by inserting only the stirring pin F2 into the joint portion J1, while keeping the connecting part F1 and joint portion J1 separated. As a result, it is possible to reduce the width of the plasticized region compared to when the shoulder part of the rotating tool is pushed in, and also to reduce the pressure of the rotating tool. Moreover, the load on the friction stir device can be reduced compared to when the shoulder part of the rotating tool is pushed in. Furthermore, in a state where a large load is not applied to the friction stir device, it is possible to join deep positions of the abutting portions. In addition, in the present embodiment, since only the stirring pin F2 comes into contact with the joint portion J1, even if the height of the joint portion J1 changes slightly, the depth of contact of the stirring pin F2 changes only slightly, and compared to when the shoulder part of the rotating tool is pushed in, there is a relatively high allowance for changes in the height of the joint portion J1. Therefore, according to the present joining method, even if the position of the first metal member 1 or the second metal member 2 is displaced from the position during the measuring step, or if the position of the stirring pin F2 is displaced from the height position set during the setting step, the measured value can be directly set as the height position of the rotating tool F, and the height position of the rotating tool F can be raised and lowered based on the set value to perform the joining, making it less likely for poor joining to occur.

Additionally, in the present joining device and present joining method, a fixing part 21a for fixing the first metal member 1 to the mounting platform K is provided, and a measuring step is performed to measure the first metal member 1 fixed to the mounting platform K. As a result, the first metal member 1, whose height position is measured, can be accurately measured in height in a situation similar to that during joining, making it easier to prevent poor joining.

Assuming that the measuring part 23 is provided at a position far from the rotating tool F, positional discrepancies between the measuring position and the joining position may occur, making it easier for height measurement errors to arise. However, according to the present embodiment, by providing the measuring part 23 near the part where the rotating tool F is held, the height position can be measured in a situation similar to that during joining. In other words, in the present embodiment, since the measuring part 23 is provided at the front part of the progressing direction of the friction stir body 22, the height position can be measured in a situation similar to that during joining.

1-4. Others

Here, for example, in the previously mentioned embodiment, the first placement step, the first fixing step, the measuring step, the second placement step, and the second fixing step are performed in this order, and it has been described by exemplifying the case where only the first metal member 1 is fixed to the mounting platform K, and then the measuring step is performed. The measuring step may be performed after performing the first placement step and the first fixing step, as well as the second placement step and the second fixing step, and fixing both the first metal member 1 and the second metal member 2 to the mounting platform K. In this case, during the measuring step, it suffices to measure the height of the surface near the joint portion J1 of at least one of the first metal member 1 and the second metal member 2, both fixed to the mounting platform K. In this way, the height can be measured accurately in a situation similar to that during joining, making it easier to prevent poor joining.

In the previously mentioned embodiment, it has been described by exemplifying the case where the height of measurement points P1 to P8, set around the outside of the opening edge 1e on the surface 1b of the first metal member 1, is measured near the joint portion J1. The position of the measurement points can be appropriately set according to the order of placement and fixation of the first metal member 1 and the second metal member 2, the placement relationship between the first metal member 1 and the second metal member 2, and the position of the joint portion J1 with respect to the first metal member 1 and the second metal member 2. It is particularly preferable to set the position of the measurement points at locations where they have a significant impact on the joining. Furthermore, the order of the placement step, fixing step, and measuring step can be appropriately changed according to the position of the measurement points.

For example, as in the previously mentioned embodiment, consider the case where a joint portion J1 is formed at the abutted part of the stepped side surface 11b of the first metal member 1 and the side surface 2a of the second metal member 2, with the stepped side surface 11b of the first metal member 1 and the side surface 2a of the second metal member 2 abutted together, and the stepped bottom surface 11a and the back surface 2c of the second metal member 2 overlapped. In this case, the peripheral portion 2d (see FIG. 5) on the surface 2b of the second metal member 2 may be used as the measurement point. Note that if the peripheral portion 2d on the surface 2b of the second metal member 2 is used as a measurement point, it is preferable to perform the first placement step, the first fixing step, the second placement step, the second fixing step, and the measuring step in this order, and to perform the measuring step after fixing the first metal member 1 and the second metal member 2 to the mounting platform K. In other words, it is preferable to perform the measuring step after fixing the site where the height position is measured.

Figure 8:
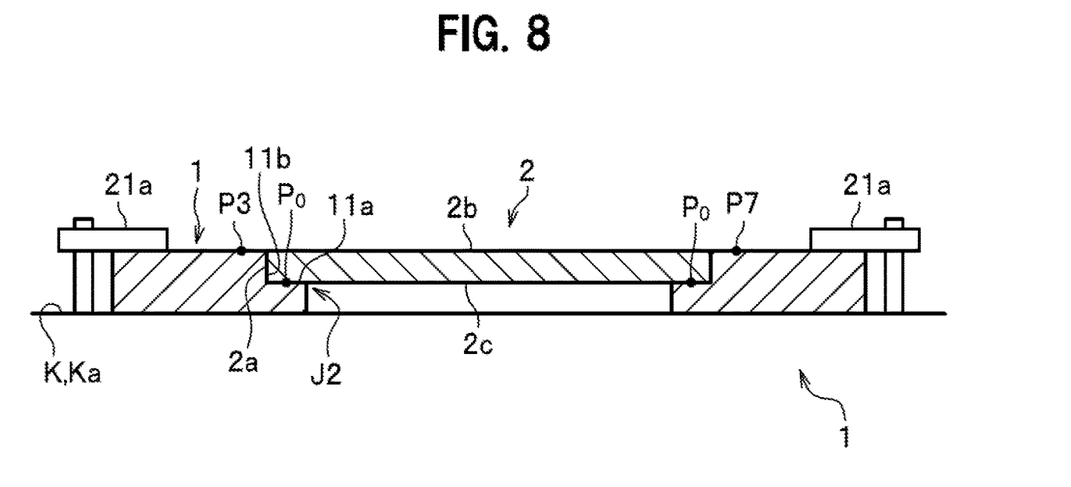
FIG. 8 is a cross-sectional view showing a joint portion formed by overlapping.

In addition, as shown in FIG. 8, in the case where a joint portion J2 is formed at the overlapping part of the stepped bottom surface 11a and the back surface 2c of the second metal member 2, with the stepped side surface 11b of the first metal member 1 and the side surface 2a of the second metal member 2 abutted together, and the stepped bottom surface 11a and the back surface 2c of the second metal member 2 overlapped, it suffices that the stepped bottom surface 11a of the first metal member 1, which is near the joint portion J2, is taken as the measurement point $P_0$. In this case, it is necessary to perform the first placement step, the first fixing step, the measuring step, the second placement step, and the second fixing step in this order, and to perform the measuring step after fixing only the first metal member 1 to the mounting platform K.

2. First Modified Example

Figure 9:
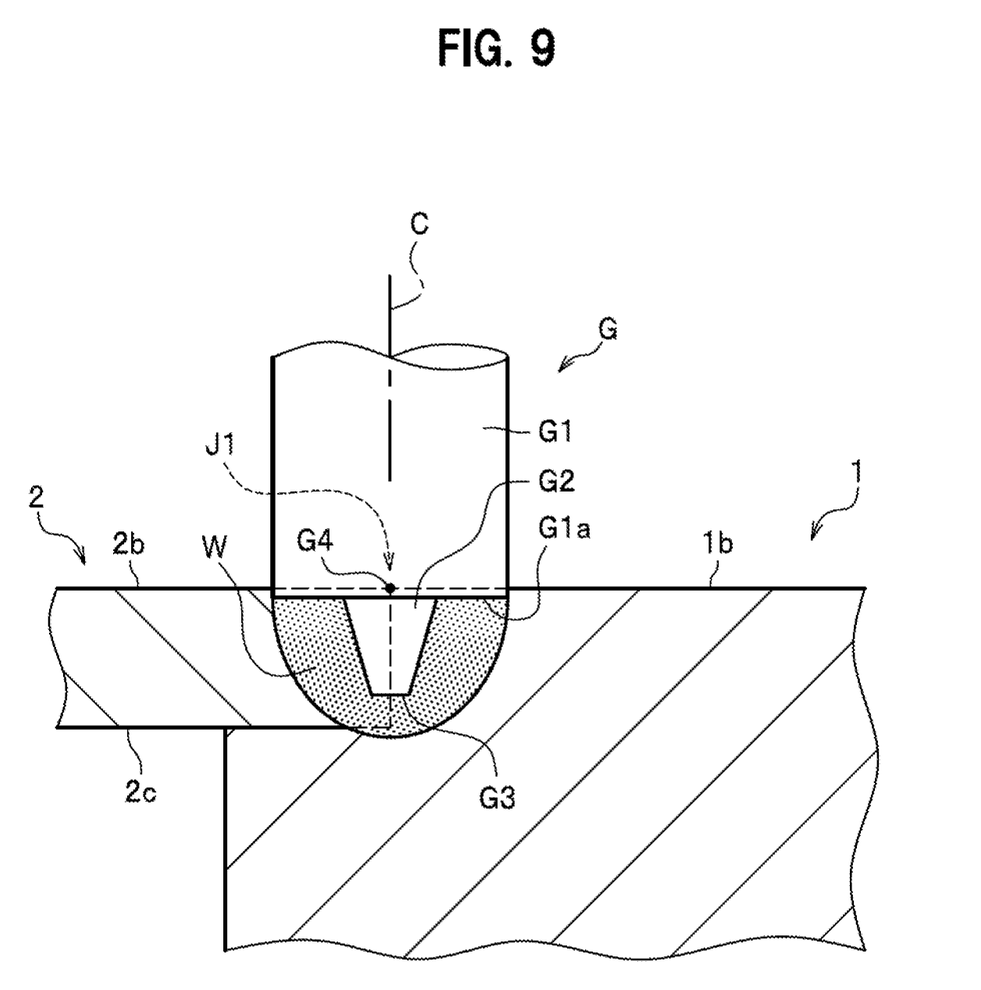
FIG. 9 is a cross-sectional view showing a friction stir step according to a first modified example of the present embodiment.

Next, a first modified example of the previously mentioned embodiment will be described. As shown in FIG. 9, the first modified example differs from the previously mentioned embodiment in that a rotating tool G is used. In the first modified example, the description will focus on the portions that are different from the previously mentioned embodiment.

The rotating tool G includes a shoulder part G1 and a stirring pin G2.

The shoulder part G1 is a part where the proximal end portion is attached to the rotating shaft of the friction stir body 22, and is a part where the bottom surface G1a presses the jointed member while in contact with the jointed member. The shoulder part G1 is cylindrically formed, expanding in diameter from the proximal end portion of the stirring pin G2, and has a planar and annular distal end surface. In other words, the distal end portion of the stirring pin G2 protrudes from the distal end surface of the shoulder part G1 toward the tip side. To put it differently, the stirring pin G2 is hanging down from the bottom surface G1a of the shoulder part G1. The shape of the shoulder part G1 is not limited to cylindrical and may have a frustoconical shape with a mortar-shaped distal end surface.

The stirring pin G2 is a part that performs friction stir on the jointed member while being rotation-inserted into the jointed member. The stirring pin G2 has a frustoconical shape, hanging down from the bottom surface G1a of the shoulder part G1. The distal end portion of the stirring pin G2 tapers as it approaches the tip. The tip of the distal end portion of the stirring pin G2 has a flat surface G3, which is a flat surface perpendicular to the axial direction. The shoulder part G1 is integrally formed with the proximal end portion of the stirring pin G2. Spiral grooves are engraved on the outer peripheral surface of the stirring pin G2. The spiral grooves are formed in a counterclockwise direction from the base end side to the tip side when the rotating tool G is rotated to the right, and in a counterclockwise direction from the base end side to the tip side when rotated to the right. By doing so, the plastic flow material is guided to the tip side of the stirring pin G2, which makes it easier to suppress the occurrence of burrs.

In the present joining device, the friction stir body 22 relatively moves the rotating tool G while keeping the shoulder part G1 and the stirring pin G2 in contact with the joint portion J1.

As shown in FIG. 9, a stirring pin reference point G4 is set at a predetermined height from the flat surface G3 of the stirring pin G2 on the rotational central axis C, which serves as the center of rotation. In the present embodiment, for example, since the insertion depth is set to 2.5 mm, the predetermined height is set to 2.5 mm. The insertion depth refers to the distance from the surface 1b of the first metal member 1 to the flat surface G3 of the stirring pin G2. Note that the distance from the flat surface G3 to the stirring pin reference point G4 can be appropriately set based on the insertion depth and the measured values obtained during the measuring step, among other factors.

In the friction stir step, friction stir joining is performed along the joint portion J1 in the same manner as in the previously mentioned embodiment. At this time, the position of the rotating tool G is controlled so that the height position of the stirring pin reference point G4 of the rotating tool G matches the set value (X position, Y position, Z position) set in the setting step. Particularly in the present embodiment, the position of the rotating tool G is moved up and down so that the Z direction becomes the height position shown in FIG. 3. In other words, at the position corresponding to the measurement point P1 in the joint portion J1, the rotating tool G is relatively moved along the joint portion J1 such that the stirring pin reference point G4 is positioned at a position in a height direction of 4.8 mm from the surface Ka of the mounting platform K. At this time, the bottom surface G1a of the shoulder part G1 comes into contact with the surfaces 1b and 2b of the first metal member 1 and the second metal member 2.

Thus, in the friction stir step, the rotating tool G having the shoulder part G1 and the stirring pin G2 may be used. According to the rotating tool G, the bottom surface G1a of the shoulder part G1 can press down the plastic flow material, which makes it easier to suppress the occurrence of burrs.

3. Second Modified Example

Figure 10:
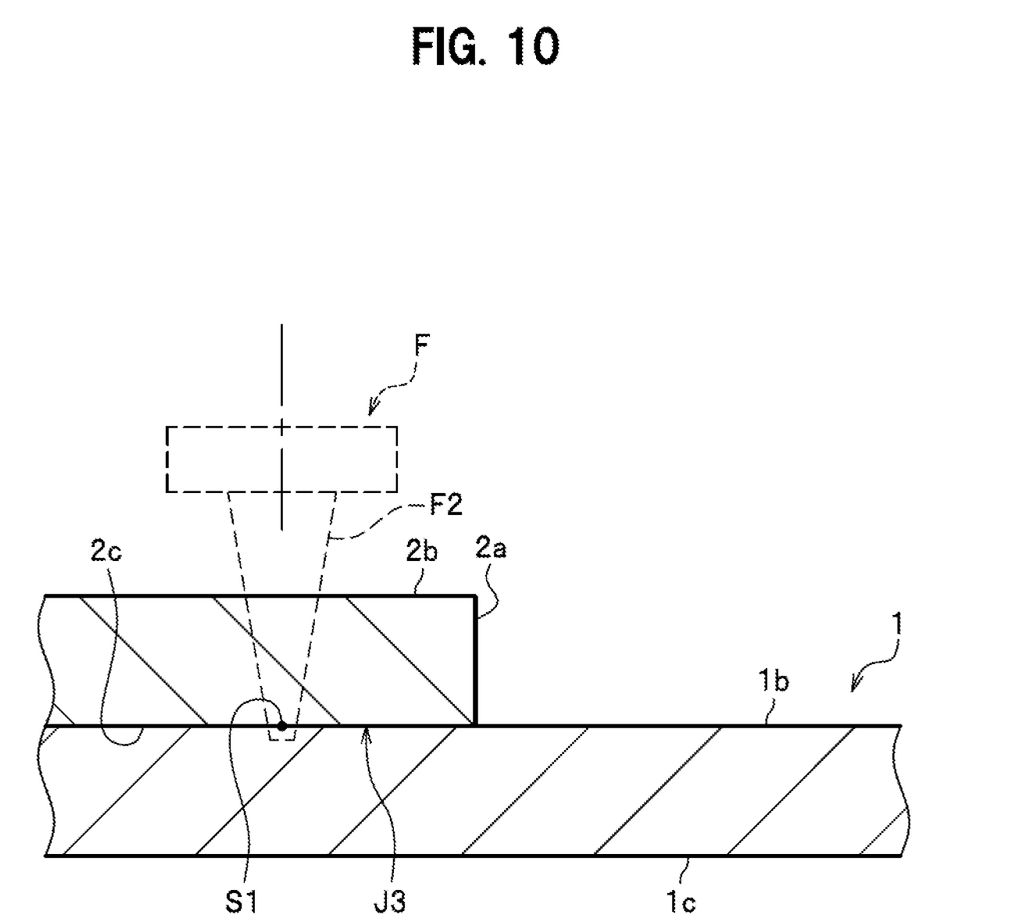
FIG. 10 is a cross-sectional view showing a friction stir step according to a second modified example of the present embodiment.

Next, a second modified example of the previously mentioned embodiment will be described. As shown in FIG. 10, the second modification differs from the previously mentioned embodiment in that the first metal member 1 and the second metal member 2 are overlapped. In the second modified example, the description will focus on the portions that are different from the previously mentioned embodiment.

In the joining method according to the second modified example, a first placement step, a first fixing step, a measuring step, a second placement step, a second fixing step, a setting step, and a friction stir step are performed. As shown in FIG. 10, in the second placement step according to the second modified example, the surface 1b of the first metal member 1 and the back surface 2c of the second metal member 2 are overlapped to form a joint portion (overlapping portion) J3.

In the measuring step, the measuring part 23 is travelled along a position corresponding to the joint portion J3 to measure the height of the surface 1b of the first metal member 1 before placing the second metal member. The measurement position is preferably near the joint portion J3. Therefore, in the present modified example, it is preferable to measure the height of the surface 1b of the first metal member 1 at the scheduled travel position S1, where the rotating tool F travels during the friction stir step, or in its vicinity.

In the second fixing step, the overlapped first metal member 1 and second metal member 2 are fixed to the mounting platform K via the fixing part 21.

In the setting step, the height position of the rotating tool F is set based on the measured value obtained in the measuring step. In the present second modified example, the measured value is set directly as the height position of the rotating tool F.

In the friction stir step, for example, the rotating tool F is used to insert the stirring pin F2 vertically into the surface 2b of the second metal member 2 from the surface 2b of the second metal member 2, joining the joint portion (overlapping portion) J3. The height position of the rotating tool F in the friction stir step is controlled in the same manner as in the previously mentioned embodiment. The insertion depth of the stirring pin F2 of the rotating tool F can be set as appropriate, but it is preferable to set it to reach the surface 1b of the first metal member 1. Note that in the second modified example, the joint portion J3 may be subjected to friction stir joining using a rotating tool G instead of the rotating tool F.

As mentioned above, in the present joining device and the present joining method, the height of the surface 1b of the first metal member 1, which corresponds to the position of the overlapping portion between the first metal member 1 and the second metal member 2 that form the joint portion, is measured. In this way, the height of the part which serves as a target position for insertion of the rotating tool and which affects the joining state is measured, and the height position (insertion depth) of the rotating tool F is controlled based on the measurement results. As a result, the rotating tool F is inserted to reach the surface 1b of the first metal member 1, and the overlapping portion is joined, making it easier to prevent poor joining.

4. Third Modified Example

Figure 11:
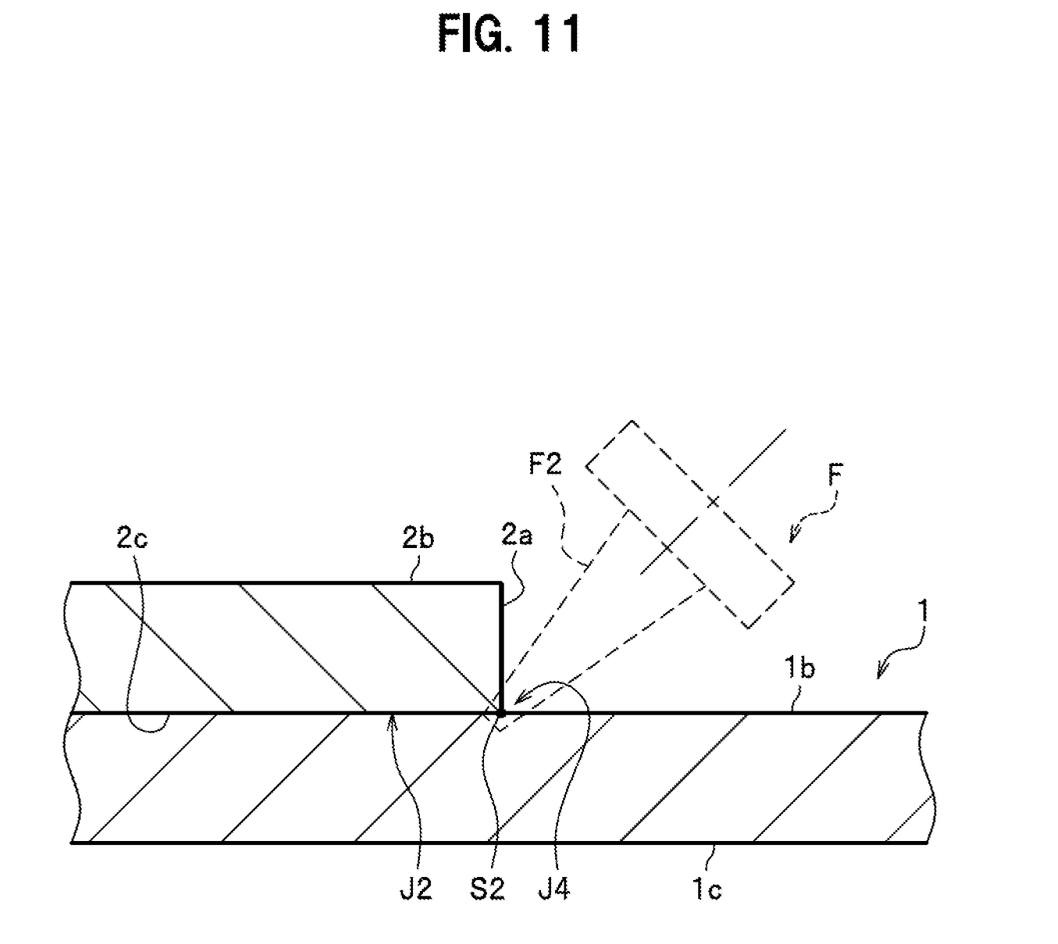
FIG. 11 is a cross-sectional view showing a friction stir step according to a third modified example of the present embodiment.

Next, a third modified example of the previously mentioned embodiment will be described. As shown in FIG. 11, the third modified example differs from the previously mentioned embodiment in that the first metal member 1 and the second metal member 2 are overlapped. In the third modified example, the description will focus on the portions that are different from the previously mentioned embodiment.

In the joining method according to the third modified example, a first placement step, a second placement step, a fixing step, a measuring step, a setting step, and a friction stir step are performed. As shown in FIG. 11, in the second placement step according to the third modified example, the surface 1b of the first metal member 1 and the side surface 2a of the second metal member 2 form a joint portion (internal corner portion) J4.

In the fixing step, as shown in FIG. 11, the overlapped first metal member 1 and second metal member 2 are fixed to the mounting platform K via the fixing part 21.

In the measuring step, the measuring part 23 is travelled along the joint portion J4 to measure the height of the surface 1b of the first metal member 1. The measurement position is preferably near the joint portion J4. Therefore, in the present modified example, it is preferable to measure the height of the scheduled travel position S2, which is located in the internal corner portion formed by the surface 1b of the first metal member 1 and the side surface 2a of the second metal member 2, or in its vicinity, where the rotating tool F travels in the friction stir step.

In the setting step, the height position of the rotating tool F is set based on the measured value obtained in the measuring step. In the present second modified example, the measured value is set directly as the height position of the rotating tool F.

In the friction stir step, as shown in FIG. 11, the rotating tool F is used to obliquely insert the rotating tool F from the joint portion (internal corner portion) J4 to friction stir join the joint portion J4. The height position of the rotating tool F in the friction stir step is controlled in the same manner as in the previously mentioned embodiment.

As mentioned above, in the present joining device and the present joining method, the height of the surface 1b of the first metal member 1, which corresponds to the position of the internal corner portion between the first metal member 1 and the second metal member 2 that form the joint portion J4, is measured. In this way, the height of the part which serves as a target position for insertion of the rotating tool F and which affects the joining state is measured, and the height position (insertion depth) of the rotating tool F is controlled based on the measurement results. As a result, the rotating tool F is inserted to reach the internal corner portion between the first metal member 1 and the second metal member 2, and the internal corner portion is joined, making it easier to prevent poor joining.

5. Fourth Modified Example

Next, a fourth modified example of the present embodiment will be described. In the fourth modified example, the setting step differs from the previously mentioned embodiment. In the setting step according to the fourth modified example, for example, when the measured values in FIG. 3 are obtained, the lowest of the measured values may be set as the height position of the rotating tools F and G. In the case of FIG. 3, since the lowest value is 4.8 mm, the rotating tools F and G are relatively moved so that the stirring pin reference points F4 and G4 of the rotating tools F and G are at a height of 4.8 mm from the surface Ka of the mounting platform K. In other words, in this case, after setting the height position of the rotating tools F and G, the rotating tools F and G are relatively moved at a constant height without raising or lowering the rotating tools F and G.

The setting step according to the modified example makes it possible to easily set the height position of the rotating tools F and G. Furthermore, by setting the lowest value among the measured values as the height position, the rotating tools F and G will be inserted to match the depth of the lowest site of the joint portion. As a result, even when the height of the joint portion changes, it is possible to perform friction stir, including the lowest position of the joint portion, making it easier to prevent poor joining.

At this time, as for the rotating tools, either rotating tool may be used, but it is preferable to use the rotating tool G. Since the height position of the rotating tool is set to the lowest measured value, it is possible to constantly press down the plastic flow material with the shoulder part G1, making it easier to prevent the generation of burrs in a large amount.

Meanwhile, in the setting step according to the fourth modified example, for example, when the measured values in FIG. 3 are obtained, the average value of the measured values may be set as the height position of the rotating tools F and G. In the case of FIG. 3, since the average value is approximately 5.3 mm, the rotating tools F and G are relatively moved so that the stirring pin reference points F4 and G4 of the rotating tools F and G are at a height of 5.3 mm from the surface Ka of the mounting platform K. In other words, in this case as well, after setting the height position of the rotating tools F and G, the rotating tools F and G are relatively moved at a constant height without raising or lowering the rotating tools F and G.

The setting step according to the modified example makes it possible to easily set the height position of the rotating tools F and G.

At this time, as for the rotating tools, either rotating tool may be used, but it is preferable to use the rotating tool F. This is because, when using the rotating tool F, only the stirring pin F2 comes into contact with the joint portion, so that compared to when using the rotating tool G, there is a relatively higher allowance for changes in the height of the joint portion. Even if the variation in each measured value is large, if the position of the first metal member 1 or the second metal member 2 is displaced from the position during the measuring step, or if the position of the stirring pin F2 is displaced from the height position set during the setting step, the height position of the rotating tool F can be set as the average value of the measured values, and the height position of the rotating tool F can be raised and lowered based on the set value to perform the joining, making it less likely for poor joining to occur.

6. Fifth Modified Example

Next, a fifth modified example of the previously mentioned embodiment will be described. The fifth modified example differs from the other modified examples in that the allowable range is set based on the measured values. In the modified example, an allowable range of height measured values is set. For example, for the measured values in FIG. 3, the allowable range is set to 4.8 to 5.5 mm. The controller 24 includes a determinator (not shown) that determines whether or not the measured values obtained by the measuring part 23 are within a preset allowable range.

For example, in the case of the previously mentioned embodiment, if the controller 24 determines that the measured values obtained in the measuring step are within a preset allowable range (determination step), it proceeds directly to the second placement step. On the other hand, if the controller determines that the measured values obtained in the measuring step are outside the preset allowable range, it outputs a reset signal to temporarily remove the first metal member 1 (first metal member 1 and second metal member 2) from the mounting platform K. Once the first metal member 1 (first metal member 1 and second metal member 2) is reset on the mounting platform K, the measuring step and determination step are performed again.

In friction stir joining, the height of the first metal member 1 and the second metal member 2 is one of the crucial factors. For example, if the height exceeds the allowable range due to insufficient clamping of the jig, there is a high risk of poor joining regardless of how the rotating tools F and G are controlled. However, according to the present modified example, by setting an allowable range for the height of the first metal member 1 and second metal member 2, it becomes easier to prevent poor joining.

On the other hand, if the controller 24 determines that the measured values obtained in the measuring step are outside the preset allowable range (determination step), it may identify the first metal member 1 (first metal member 1 and second metal member 2) as a product out of the allowable range and store it in the memory 29. According to the present invention, it becomes easier to prevent poor joining and to perform quality control more easily.

REFERENCE SIGNS LIST

1 first metal member
2 second metal member
21*a*, 21*b* fixing part
22 friction stir body
23 measuring part
P1 to P8 measurement point
F rotating tool
F1 connecting part
F2 stirring pin
G rotating tool
G1 shoulder part
G2 stirring pin

The invention claimed is:

1. A joining device comprising:
a fixing part that fixes a first metal member to a mounting platform;
a measuring part that measures a height from a surface of the mounting platform to a surface, into which a rotating tool is inserted, of the first metal member near a joint portion, which serves as a part for joining formed by the first metal member and a second metal member placed in a positional relationship for joining by abutting or overlapping, and obtains measured value or values;
a setting part that is configured to set a height position of the rotating tool based on the measured value or values obtained by the measuring part; and
a friction stir body that relatively moves the turning rotating tool along the joint portion based on the height position.

2. The joining device according to claim 1, wherein the measuring part measures the first metal member fixed to the mounting platform to obtain the measured values.

3. The joining device according to claim 1, wherein the fixing part fixes the first metal member and the second metal member to the mounting platform, with the first metal member and the second metal member being placed in a positional relationship for joining by abutting or overlapping, thereby forming the joint portion, and
the measuring part measures at least one of the first metal member and the second metal member fixed to the mounting platform to obtain the measured values.

4. The joining device according to claim 1, wherein the measuring part is provided near a part where the rotating tool is held.

5. The joining device according to claim 1, wherein the setting part is configured to set the measured values as the height position.

6. The joining device according to claim 5, wherein the rotating tool includes a connecting part that is connected to a rotating shaft of the friction stir body, and a stirring pin that hangs down from the connecting part, and
the friction stir body inserts only the stirring pin into the joint portion while keeping the connecting part away from the joint portion, thereby relatively moving the rotating tool.

7. The joining device according to claim 1, wherein the setting part is configured to set a lowest value among the measured values to the height position.

8. The joining device according to claim 7, wherein
the rotating tool includes a shoulder part that is connected to a rotating shaft of the friction stir body, and a stirring pin that hangs down from the shoulder part, and
the friction stir body relatively moves the rotating tool while keeping the shoulder part and the stirring pin in contact with the joint portion.

9. The joining device according to claim 1, wherein the setting part is configured to set an average value of the measured values to the height position.

10. The joining device according to claim 9, wherein
the rotating tool includes a connecting part that is connected to a rotating shaft of the friction stir body, and a stirring pin that hangs down from the connecting part, and
the friction stir body inserts only the stirring pin into the joint portion while keeping the connecting part away from the joint portion, thereby relatively moving the rotating tool.

11. The joining device according to claim 1, wherein if the measured values are not within a preset allowable range, the first metal member and the second metal member are reset.

12. The joining device according to claim 1, wherein if the measured values are not within a preset allowable range, the first metal member and the second metal member are identified as a product out of the allowable range.

13. A joining method comprising:
a fixing step that fixes the first metal member to a mounting platform;
a measuring step that measures a height from a surface of the mounting platform to a surface, into which a rotating tool is inserted, of the first metal member near a joint portion, which serves as a part for joining formed by the first metal member and a second metal member placed in a positional relationship for joining by abutting or overlapping, and obtains measured value or values;
a setting step that sets a height position of the rotating tool based on the measured value or values obtained by the measuring step; and
a friction stir step that relatively moves the turning rotating tool along the joint portion based on the height position set by the setting step.

14. The joining method according to claim 13, wherein the measuring step measures the first metal member fixed to the mounting platform in the fixing step to obtain the measured values.

15. The joining method according to claim 13, further comprising:
a fixing step that fixes the first metal member and the second metal member to a mounting platform, wherein
the fixing step fixes the first metal member and the second metal member to the mounting platform, with the first metal member and the second metal member being placed in a positional relationship for joining by abutting or overlapping, thereby forming the joint portion, and
the measuring step measures at least one of the first metal member and the second metal member fixed to the mounting platform in the fixing step to obtain the measured values.

16. The joining method according to claim 13, further comprising:

a first disposing step of disposing the first metal member on the mounting platform;

a second disposing step of disposing the first metal member and the second metal member in a positional relationship in which the first metal member and the second metal member are joined to each other;

wherein in the fixing step, the first metal member arranged in the first arranging step is fixed; and wherein in the second arranging step, the first metal member fixed in the fixing step and the second metal member are arranged in a positional relationship for joining.

17. The joining device according to claim 1, wherein the setting part includes a setting program that is programmed to set the height position of the rotating tool based on the measured value or values obtained by the measuring part.

* * * * *